Oct. 11, 1960     R. B. MATTHEWS     2,956,267
TEMPERATURE INDICATING DEVICE
Filed July 2, 1956
*Fig. 2*
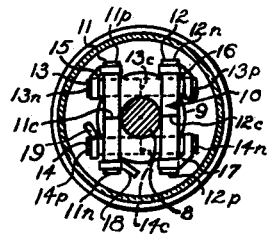
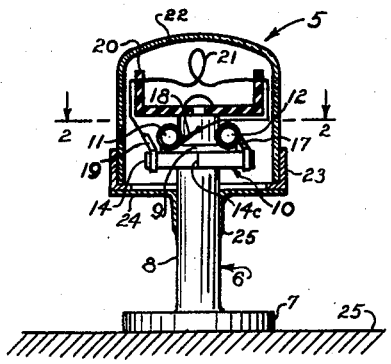
*Fig. 1*
INVENTOR.
Russell B. Matthews
BY
Seegert & Schwalbach
Attys United States Patent Office 2,956,267
Patented Oct. 11, 1960

2,956,267

TEMPERATURE INDICATING DEVICE

Russell B. Matthews, Wauwatosa, Wis., assignor, by mesne assignments, to Minnesota Mining and Manufacturing Company, St. Paul, Minn., a corporation of Delaware Filed July 2, 1956, Ser. No. 595,270

6 Claims. (Cl. 340—227)

This invention relates to improvements in temperature indicating devices, and more particularly to devices of this character which are thermoelectrically powered.

The use of thermocouples in the measurement of temperatures has, because of the limited power generated by available thermocouples, required the use of expensive meters, for example milliammeters responsive to said limited power, for indication of the temperature sensed. Research in recent years has developed new alloys, particularly semi-metallic alloys which, when used as thermoelectric generator elements, afford power generation of a much higher order than has heretofore been available from thermoelectric generators of comparable size utilizing conventional materials as generator elements.

It is therefore a general object of the present invention to provide an improved temperature indicating device having incorporated therein a thermoelectric generator of novel construction, as well as an inexpensive electroresponsive temperature indicating element energizable by current from said generator in response to predetermined temperatures.

Another object of the invention is to provide an improved temperature indicating device of the aforementioned character which is unitary and compact in construction and therefore readily portable, the temperature indicating element thereof taking the form of an electrical resistance filament which becomes heated to afford a visual indication when energized by current from the generator.

Still another object of the invention is to provide an improved temperature indicating device of the class described having a heat conducting temperature sensing member, the thermoelectric generator of said device taking the form of a thermopile comprising a plurality of thermoelectric generators each having a thermojunction in heat conducting engagement with said temperature sensing member.

Still another object of the invention is to provide an improved temperature indicating device of the aforementioned character wherein the thermocouples forming the thermo-electric generator comprise semi-metallic, preferably P-N, thermoelements.

A further object of the invention is to provide an improved temperature indicating device of the character described which is operable to sense predetermined cold as well as hot temperatures.

Further objects and advantages of the invention will become apparent as the description proceeds, reference being had to the accompanying drawing illustrating one embodiment of the invention, wherein:

Figure 1 is an elevational view, partly in vertical section, of one form of the improved temperature indicating device; and Figure 2 is a sectional plan view taken approximately along the line 2—2 of Figure 1.

Referring more particularly to Figure 1 of the drawing, the numeral 5 indicates the illustrated embodiment of the improved temperature indicating device. The device 5 comprises a pedestal-like temperature sensing member 6, preferably of metal having high heat conductivity characteristics, said member having an enlarged base portion 7 and having a stem portion 8. Fixed on the stem portion 8 adjacent the end thereof opposite the enlargement 7, is an annular member 9 of heat insulating material, and carried on said stem portion in engagement with the heat insulating member 9 is a thermoelectric generator 10 which, in the illustrated embodiment, takes the form of a thermopile comprising thermocouples 11, 12, 13 and 14.

The thermocouples 11, 12, 13 and 14 preferably each comprise coaxial cylindrical semi-metallic thermoelements, the thermoelements for each couple being indicated by the same reference characters as said thermocouple but bear the suffixes $n$ and $p$ respectively. The thermoelements of each couple are joined in end to end relationship for example by a thin film of solder affording an ohmic or non-rectifying junction operable as a thermojunction indicated by the same reference character as the couple and bearing the suffix $c$. As shown in the drawing, the thermocouples 11 and 12 engage one side, i.e. the upper side in Figure 1, of the annular member 9 and are in substantially parallel relationship, with the thermojunctions $11c$ and $12c$ in heat conducting engagement with diametrically opposite side wall surface portions of the stem 8. The thermocouples 13 and 14 engage the opposite side, i.e. the under side in Figure 1, of the annular member 9 and are in parallel relationship normal to the generators 11 and 12 and have the thermojunctions $13c$ and $14c$ in heat conducting engagement with diametrically opposite side wall surface portions of the stem 8.

As will hereinafter more fully appear, the thermoelements bearing the suffix "$n$" are preferably "N" type, and those bearing the suffix "$p$" are preferably "P" type, so that the outer ends of thermoelements of opposite sign are juxtaposed. The adjacent outer ends of the thermoelements $11p$ and $13n$ are electrically connected by a low resistance thermojunction and contact member 15. The adjacent outer ends of the thermoelements $12n$ and $13p$ are electrically connected by a low resistance thermojunction and contact member 16, and the outer ends of the thermoelements $12p$ and $14n$ are electrically connected by a low resistance thermojunction and contact member 17. The outer ends of the thermoelements $11n$ and $14p$ are provided with thermojunction and contact members 18 and 19 respectively, which afford terminals for the generator 10.

Fixed to the end of the stem 8 adjacent the generator 10 is a generally U-shaped member 20 of electrical insulating material, and supported on the member 20 is an electrical resistance type filament 21, one end of which is connected in circuit with the thermojunction member 18, and the other end of which is connected in circuit with the thermojunction member 19 as shown in Figure 1. It will thus be observed that the filament 21 and the thermocouples 11, 12, 13 and 14 are connected in series circuit relation.

The generator 10 and the filament 21 are enclosed within an hermetically sealed enclosure, for example an evacuated enclosure, comprising a generally cup-shaped transparent, for example glass, member 22 which is fused to an annular angle member 23. The member 23 is, in turn, sealingly connected, as by silver soldering or brazing, to a centrally apertured wall member 24 formed with a tubular extension 25 through which the stem projects, and to which said tubular extension is sealingly connected, as by silver soldering or brazing.

The thermoelements $11n$ to $14n$ and $11p$ to $14p$ are preferably formed of a semi-metallic alloy or composition which may be characterized as a binary metallic compound of slightly imperfect composition, i.e. containing beneficial impurities constituting departures from perfect stoichiometry by reasons of an excess of one of the metals over the other, and/or containing added beneficial impurity substances hereinafter referred to as "promoters." Such semi-metallic compositions have semiconductor like conductance, both electrical and thermal, and include mixtures of such binary metallic compounds, which may be denominated ternary metallic alloys or compositions. Certain of these alloys or compositions exhibit negative and certain exhibit positive electrical characteristics. It is preferred that one thermoelement of each of the generators 11, 12, 13 and 14 exhibit negative electrical characteristics, and that the other thermoelement of each of said generators exhibit positive electrical characteristics, so that each of said thermocouples is of the P-N type.

More specifically, the negative thermoelements, for example the thermoelements 11n to 14n may, for example, be formed of an alloy further described in the copending application of Sebastian Karrer, Serial No. 475,540, filed December 15, 1954, now Patent No. 2,811,570, and assigned to the assignee of the present application, said alloy comprising lead and at least one member of the group tellurium, selenium and sulphur. For example, the negative thermoelements of lead-selenium-tellurium composition could include a tellurium-selenium constituent in which the selenium is but a trace. In this case such constituent should constitute from 35% to 38.05% by weight of the composition, the balance (61.95% to 65% by weight) being lead. At the other extreme, where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

The negative thermoelements may also be formed of an alloy of lead, selenium and sulphur. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes the selenium-sulphur constituent varies linearly with the ratio of selenium to sulphur (expressed in atomic percent) in the solenium-sulphur constituent.

With regard to the aforementioned compositions it will be observed that in each case there is an excess of lead over and above the amount thereof necessary for satisfying the stoichiometric proportions of the compound formed in the second constituent or constituents, i.e. the tellurium, selenium or sulphur. For example, the composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example in thermoelectric generator elements, can be markedly and advantageously altered in a reproducible manner by the addition thereto of controlled amounts of matter other than the constituents of the base composition. Such additions may also be denominated "beneficial impurities" as distinguished from undesirable impurities. For convenience, these additions are hereinafter designated "promoters," since they tend to enhance the electrical characteristics desired for the particular application of the base compositions.

The aforedescribed base compositions exhibit negative thermoelectric power and negative conductivity. By the addition of certain "promoters," such negative properties may be enhanced, while the polarity of the electrical properties of the base composition may be reversed by the addition of certain other promoters to provide a semi-metallic composition having positive electrical characteristics. Compositions having the aforementioned positive electrical characteristics are preferred for use as the thermoelements 11p to 14p. Suitable negative promoters are bismuth, tantalum, zirconium, titanium, gallium, bromine and iodine; while suitable positive promoters are sodium and potassium. The copending application of Robert W. Fritts and Sebastian Karrer, Serial No. 475,488, filed on December 15, 1954, now Patent No. 2,811,571, and assigned to the assignee of the present application, gives a complete description of the beneficial impurities, including both departures from perfect stoichiometry and promoters, which have been found to be effective for improvement of the electric properties of the semi-metallic thermoelectric generator elements when added to the aforementioned base composition in minor amounts. For example up to a maximum of 6.9% by weight of beneficial impurity, including 3.9% excess lead and 3.0% promoter.

The proportions and ranges of the various constituents aforementioned and particularly the minimum limits of lead constituent in the compositions, must be regarded as critical if the composition is to have the electrical and physical properties desired. If the lead content is significantly less than the minimum amount indicated for any particular selenium-tellurium or selenium-sulphur proportion, the polarity of the Seebeck E.M.F. changes and the desired electrical and mechanical properties will not be reproducible. On the other hand, if the lead content of any composition appreciably exceeds the aforementioned maximum limits, the resulting composition is too metallic in nature to afford satisfactory energy conversion efficiencies.

Not only are the proportions and ranges aforedescribed to be considered critical, but so also is the purity. More specifically, the limit of tolerable metallic impurity in non-promoted final compositions has been found to be on the order of 0.01%, and the composition must be substantially oxygen free, if the mechanical and electrical properties desired are to be obtained and are to be reproducible. In the case of promoted compositions, however, the limit of tolerable impurity is 0.001%.

In the operation of the improved temperature indicating device, a determination of whether or not the temperature of a surface, for example, a surface 25, exceeds a predetermined high value can be made by placing the base portion 7 of the temperature sensing member 6 in surface contact therewith as shown in Figure 1. If the temperature of the surface 25 exceeds that for which the device 5 is designed to give an indication, heat is conducted from said surface through the base portion 7 and stem portion 8 of the member 6 to the thermojunctions 11c to 14c, raising the temperature of said thermojunctions with respect to the thermojunctions afforded by the members 15 to 19 at the outer ends of the thermoelements to create a sufficient temperature differential between the thermojunctions of each thermocouple for the generation by the combined couples of a current sufficient to cause the filament 21 to glow.

The improved temperature indicating device is likewise useable to indicate cold temperatures below a predetermined value. A determination of whether or not the temperature of the surface 25 is below a predetermined level for which the device is designed to give an indication can be made in the same manner as heretofore explained with respect to high temperature determination. Placement of the base portion 7 of the member 6 in surface contact with a cold surface causes heat to be withdrawn from the thermojunctions 11c to 14c through the stem 8 and base 7 to the aforementioned cold surface. If the temperature of the surface is below the aforementioned predetermined level, the temperature of the thermojunctions 11c to 14c will be reduced with respect to that of the thermojunctions afforded by members 15 to 19 to thereby create a temperature differential between the thermojunctions of each thermocouple sufficient to cause the combined thermocouples 11 to 14 to generate a current of a magnitude to cause the filament 21 to glow.

The improved temperature indicating device is compact and unitary in structure and is readily portable. The simplicity of its construction renders the latter not only inexpensive, but also well adapted for economical fabrication.

The specific illustration and corresponding description are used for the purpose of disclosure only, and are not intended to impose unnecessary limitations on the claims, or to confine the patented invention to a particular use. Various changes and modifications may be made without departing from the spirit of the invention, and all of such changes are contemplated as may come within the scope of the appended claims.

What is claimed as the invention is:

1. In combination, a heat conductive member having a generally cylindrical portion, a first pair of thermocouples disposed in a plane generally normal to said cylindrical portion, said thermocouples each comprising a pair of elongated thermoelements joined in coaxial end-to-end relation to form a thermojunction, said thermocouples being disposed on opposite sides of the cylindrical portion of said heat conductive member in parallel relation and with said thermojunctions in heat conducting engagement with said heat conducting member, a second pair of thermocouples disposed in a plane adjacent and generally parallel with that of said first thermocouples, said second thermocouples also each comprising a pair of elongated thermoelements joined in coaxial end-to-end relation to form a thermojunction, said second thermocouples being disposed on opposite sides of the cylindrical portion of said heat conductive member in parallel relation generally normal to said first thermocouples and with said thermojunctions thereof in heat conducting engagement with said heat conducting member and with the outer end portions of the thermoelements of said first thermocouples juxtaposed to those of said second thermocouples, and means electrically connecting the juxtaposed thermoelement end portions of said first and second pairs of thermocouples to afford thermojunctions therebetween and to serially connect said thermocouples to form a thermopile operable to generate thermoelectric current in response to exposure of said heat conducting member to a predetermined temperature.

2. A composite portable temperature indicating device comprising, a heat conductive member having a generally cylindrical portion, a first pair of thermocouples disposed in a plane generally normal to said cylindrical portion, said thermocouples each comprising a pair of elongated thermoelements joined in coaxial end-to-end relation to form a thermojunction, said thermocouples being disposed on opposit sides of the cylindrical portion of said heat conductive member in parallel relation and with said thermojunctions in heat conducting engagement with said heat conducting member, a second pair of thermocouples disposed in a plane adjacent and generally parallel with that of said first thermocouples, said second thermocouples also each comprising a pair of elongated thermoelements joined in coaxial end-to-end relation to form a thermojunction, said second thermocouples being disposed on opposite sides of the cylindrical portion of said heat conductive member in parallel relation generally normal to said first thermocouples and with said thermojunctions thereof in heat conducting engagement with said heat conducting member and with the outer end portions of the thermoelements of said first thermocouples juxtaposed to those of said second thermocouples, means electrically connecting the juxtaposed thermoelement end portions of said first and second pairs of thermocouples to afford thermojunctions therebetween and to serially connect said thermocouples to form a thermopile operable to generate thermoelectric current in response to exposure of said heat conducting member to a predetermined temperature, and electroresponsive indicator means carried by said heat conductive member and connected for energization by current from said thermopile.

3. A composite manually portable temperature indicating device comprising a heat conductive member having a temperature sensing surface portion adapted to be placed in heat conducting contact with a surface the temperature of which is to be sensed, a thermoelectric generator carried by another portion of said heat conductive member and comprising at least one thermocouple having a pair of dissimilar thermoelements joined to form a thermojunction disposed in heat conducting engagement with said heat conducting member, and electroresponsive indicating means carried by said heat conducting member and connected for energization by current from said generator in response to contact of said temperature sensing surface portion with a surface having a predetermined temperature.

4. A composite manually portable temperature indicating device comprising a heat conductive member having a temperature sensing surface portion adapted to be placed in heat conducting contact with a surface the temperature of which is to be sensed, a thermopile carried by another portion of said heat conductive member and comprising a plurality of dissimilar thermoelements serially joined to form a plurality of thermojunctions alternate ones of which are disposed in heat conducting engagement with said heat conducting member, and an electrical resistance filament insulatably carried by said heat conducting member and connected for energization by current from said generator in response to contact of said temperature sensing surface portion with a surface having a predetermined temperature.

5. A composite manually portable temperature indicating device comprising an enclosure, a heat conductive member extending through a wall portion of and fixed to said enclosure and having an external temperature sensing surface portion adapted to be placed in heat conducting contact with a surface the temperature of which is to be sensed, a thermoelectric generator carried by said heat conductive member and comprising at least one thermocouple having a pair of dissimilar thermoelements joined to form a thermojunction disposed in heat conducting engagement with said heat conducting member within said enclosure, and electroresponsive indicating means carried by said heat conducting member within said enclosure and connected for energization by current from said generator in response to contact of said temperature sensing surface portion with a surface having a predetermined temperature.

6. A composite manually portable temperature indicating device comprising an enclosure having a light permeable portion, a heat conductive member extending through a wall portion of and fixed to said enclosure and having an external temperature sensing surface portion adapted to be placed in heat conducting contact with a surface the temperature of which is to be sensed, a thermoelectric generator carried by said heat conductive member and comprising at least one thermocouple having a pair of dissimilar thermoelements joined to form a thermojunction disposed in heat conducting engagement with said heat conducting member within said enclosure, and an electrical resistance filament insulatably carried by said heat conducting member within said enclosure adjacent said light permeable portion and connected for energization by current from said generator only to generate light rays visible from the exterior of said enclosure through said light permeable portion in response to contact of said temperature sensing surface portion with a surface having a predetermined temperature.

References Cited in the file of this patent

UNITED STATES PATENTS

| | | | |
|---|---|---|---|
| 2,048,681 | Davidson et al. | July 28, | 1936 |
| 2,127,315 | Thayer | Aug. 16, | 1938 |
| 2,375,870 | Ray | May 15, | 1945 |
| 2,376,920 | Jones | May 29, | 1945 |
| 2,407,678 | Ohl | Sept. 11, | 1946 |
| 2,473,940 | Clark | June 21, | 1949 |
| 2,510,397 | Hansell | June 6, | 1950 |
| 2,597,752 | Salisbury | May 20, | 1952 |
| 2,702,828 | Arvin | Feb. 22, | 1955 |